Feb. 2, 1954
J. G. REDDECK
2,668,189
COLOR TELEVISION
Filed Feb. 1, 1952
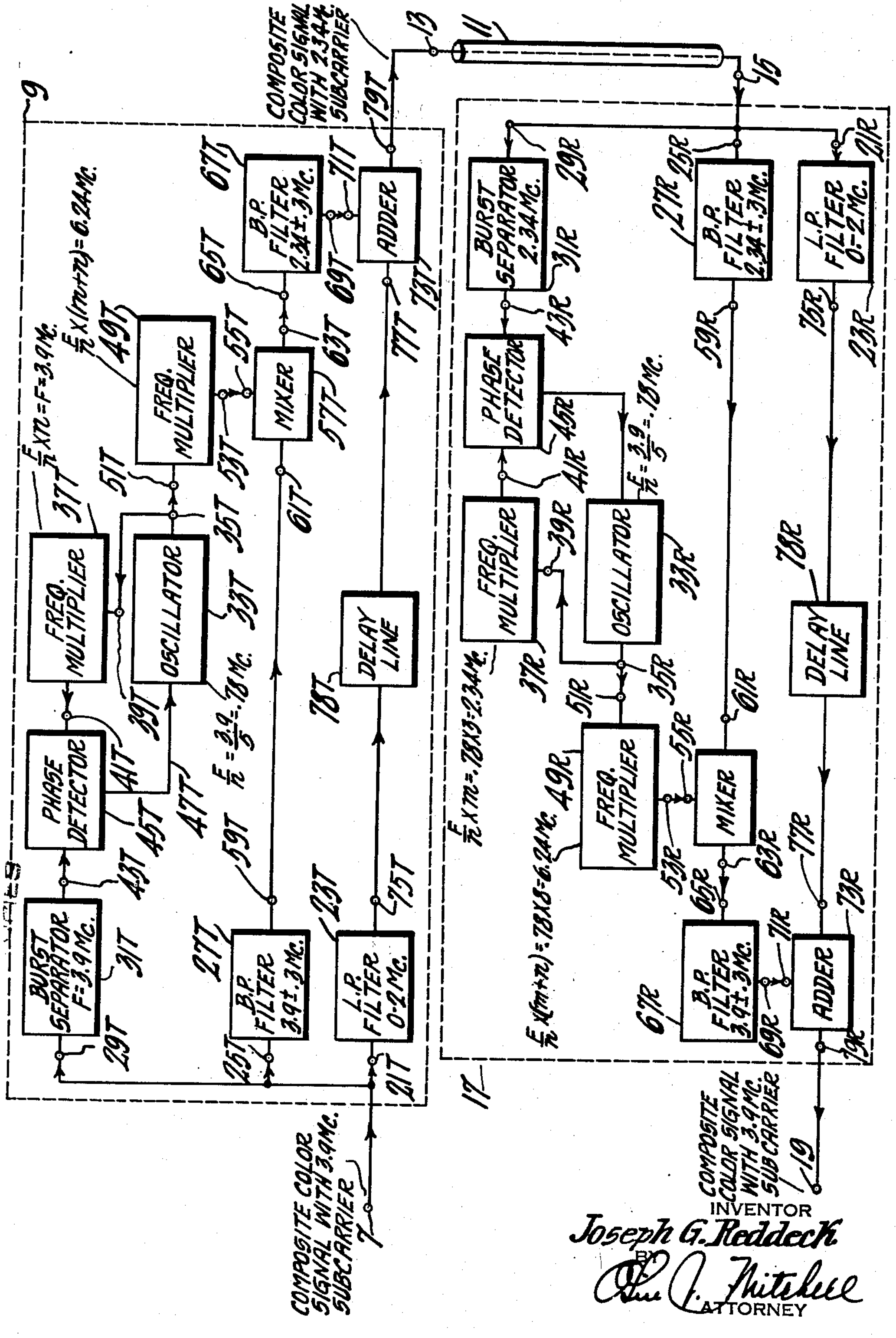
INVENTOR
Joseph G. Reddeck
BY
ATTORNEY Patented Feb. 2, 1954

2,668,189

UNITED STATES PATENT OFFICE 2,668,189

COLOR TELEVISION

Joseph G. Reddeck, New Brunswick, N. J., assignor to Radio Corporation of America, a corporation of Delaware Application February 1, 1952, Serial No. 269,477

3 Claims. (Cl. 178—5.4)

This invention relates to apparatus to shift the frequency of the color subcarrier of a composite color television signal for bandwidth reduction purposes.

One type of color television signal can be considered as comprising a brightness component extending from zero to approximately 4.1 megacycles, and a color component having a color subcarrier at 3.9 megacycles with sidebands extending approximately 2 megacycles on either side of the color subcarrier frequency. The upper sideband is restricted by the overall bandwith limitations of the television system so that the upper sideband is cut off above 4.1 megacycles.

In order to transmit this 0–4.1 megacycles color television signal over a coaxial cable having a narrower bandwidth (such as 0–2.7 megacycles) it is necessary to change the color subcarrier frequency from 3.9 megacycles to a lower value which is within the pass band of the cable. In one proposed system the color subcarrier is set at 2.34 megacycles with sidebands of .3 megacycle extending either side of the carrier. The brightness component of the color television signal is limited to a frequency band extending from zero to 2.0 megacycles. At the receiving end of this coaxial cable, the color subcarrier frequency is changed from 2.34 megacycles to its original frequency of 3.9 megacycles. Such a system is described and claimed in United States patent of R. D. Kell, Number 2,627,549, issued February 3, 1953.

It is an object of this invention to provide apparatus to shift the frequency of the color subcarrier of a composite color television signal.

It is a further purpose of this invention to provide apparatus to shift the frequency of the color subcarrier of a composite color television signal without using frequency divider circuits.

According to the present invention, an oscillator runs at a sub-harmonic of the frequency of the color subcarrier of a normal color television signal (for example at a sub-harmonic of 3.9 megacycles). The output frequency of this oscillator is multiplied and applied to a phase detector for lock-in of the oscillator frequency with the burst frequency of the input signal. The output frequency of the oscillator is then multiplied to obtain a heterodyning frequency.

Other and incidental objects of this invention will be apparent to those skilled in the art from a reading of the following specification and an inspection of the accompanying drawing which shows an embodiment of this invention.

Referring now to the drawing, there is shown at point 7 a source of composite color television signal whose color subcarrier is at a frequency of $F=3.9$ megacycles. This signal is fed through a transmitter heterodyne unit 9 to a utilization circuit 11 having an input terminal 13 and an output terminal 15. At terminals 13 and 15 the frequency of the color subcarrier is $f=2.34$ megacycles. The utilization circuit 11 is shown as a coaxial cable.

Terminal 15 can be considered as a source of composite color television signal whose color subcarrier is at a frequency of $f=2.34$ megacycles. This signal is fed through a receiver heterodyne unit 17 to the input terminal 19 of a utilization circuit (not shown). At terminal 19 the frequency of the color subcarrier is $F=3.9$ megacycles.

As the transmitter heterodyne unit 9 and the receiver heterodyne unit 17 have similar structures, the description that follows is written in terms that will apply to both these units. Similar components are given the same reference numerals, the suffix "T" being used for the components of transmitter heterodyne unit 9 and the suffix "R" being used for the components of the receiver heterodyne unit 17.

A heterodyne unit is considered to shift the frequency of the color subcarrier of a composite color television signal from a first (or input) frequency to a second (or output) frequency. The higher of these frequencies is designated as "F," while the lower of these frequencies is designated as "f."

$$\frac{F}{f} \text{ is equal to } \frac{n}{m}$$

In the specific embodiment of the present invention shown in the drawing:

$$F=3.9 \text{ megacycles}$$
$$f=2.34 \text{ megacycles}$$
$$n=5$$
$$m=3$$

The source (7 or 15) of composite color television signal whose subcarrier is at a first (or input) frequency is connected to the input terminal 21 of a low pass filter 23. The same source (7 or 15) of composite color television signal is also connected to the input terminal 25 of a band pass filter 27 and to the input terminal 29 of a burst separator 31. The band pass filter 27 is designed to pass the first (or input) frequency together with side bands of a predetermined width (in the illustrated embodiment the side bands each have a width of .3 megacycle). The burst separator 31 is designed to separate the first (or input) frequency from the composite color television signal.

An oscillator 33 having an output terminal 35 generates a frequency of $$\frac{F}{n}$$

which in the illustrated embodiment is equal to .78 megacycle. A frequency multiplier 37 has its input terminal 39 connected to the output terminal 35 of the oscillator 33. The multiplication factor of multiplier 37 is such that when the frequency generated by oscillator 33 is applied to it the multiplier 37 will have a frequency output, at its terminal 41, equal to the frequency present at the output terminal 43 of the burst separator 31. A phase detector 45 is connected between terminals 41 and 43. This phase detector produces a signal which, when applied to oscillator 33 via lead 47, locks the frequency of the oscillator to the first (or input) frequency.

A frequency multiplier 49 has its input terminal 51 connected to the output terminal 35 of oscillator 33. The frequency multiplier 49 has a multiplication factor which is equal to the sum of $m$ and $n$.

The output terminal 53 of the frequency multiplier 49 is connected to an input terminal 55 of a mixer 57. The output terminal 59 of the band pass filter 27 is connected to an input terminal 61 of mixer 57. The output terminal 63 of the mixer 57 is connected to the input terminal 65 of a band pass filter 67. The band pass filter 67 is designed to pass the second (or output) frequency together with side bands of a predetermined width (in the illustrated embodiment of this invention the side bands each have a width of .3 megacycle). The output terminal 69 of the band pass filter 67 is connected to an input terminal 71 of an adder circuit 73. The output terminal 75 of the low pass filter 23 is connected to an input terminal 77 of adder 73 through a delay line 78. The signal present at the output terminal 79 of adder 73 is applied to the input terminal (13 or 19) of a utilization circuit.

A heterodyne unit will thus have two paths. One path, comprising the low pass filter 23 and the delay line 78, passes the brightness component of the composite color television signal. Another path, comprising band pass filter 27, mixer 57 and band pass filter 67, passes and shifts the color subcarrier component of the composite color television signal. The brightness and color components are added in adder 73.

The shifting of the color subcarrier is done in mixer 57 by means of a heterodyning frequency obtained at the output terminal 53 of multiplier 49. This heterodyne frequency is locked to the frequency of the color subcarrier of the input signal. The oscillator is run at frequency of $$\frac{F}{n}$$

Its output frequency is multiplied to a value equal to the frequency of the burst of the input signal. These two frequencies are applied to a phase detector whose output signal keeps the frequency of the oscillator 33 locked in to the subcarrier frequency of the incoming signal in a well known manner. The heterodyne frequency is equal to the oscillator frequency multiplied by a factor equal to the sum of $m$ and $n$.

It will be noted that the circuit according to the present invention avoids the use of dividers. This is important as dividers may not remain stable all the time and under all operating conditions. It will also be noted that the oscillator 33 runs at the same frequency in both the transmitter heterodyne unit 9 and the receiver heterodyne unit 17.

What is claimed is:

1. Apparatus to shift the frequency of the color subcarrier of a composite color television signal from a first frequency to a second frequency, the ratio of the higher of these frequencies "F" to the lower of these frequencies "$f$" being equal to $$\frac{n}{m}$$

said composite color television signal including a burst at said first frequency, said apparatus comprising: a source of composite color television signal whose color subcarrier is at said first frequency, a first band pass filter having input and output terminals and designed to pass said first frequency together with sidebands of a predetermined width, a connection between the source of composite color television signal and the input terminal of said first band pass filter, a burst separator circuit having input and output terminals and arranged to separate said first frequency from said composite color television signal, a connection between the source of composite color television signal and the input terminal of said burst separator circuit, an oscillator having an output terminal and running at a frequency equal to $F/n$, a first multiplier having input and output terminals and whose multiplication factor is such that when connected to said oscillator the multiplier output will have a frequency equal to said first frequency, a connection between the oscillator output terminal and the input terminal of said first multiplier, a phase detector connected between the output terminals of said burst separator and of said first multiplier and arranged to produce a signal, a connection to apply said signal to said oscillator to lock its operating frequency with said first frequency, a second multiplier having input and output terminals and whose multiplication factor is equal to the sum of $m$ and $n$, a connection between the output terminal of said oscillator and the input terminal of said second multiplier, a mixer having input and output terminals, a connection between an input terminal of said mixer and the output terminal of said second multiplier, a connection between the output terminal of said first band pass filter and an input terminal of said mixer, a second band pass filter having input and output terminals and designed to pass said second frequency together with sidebands of a predetermined width, a connection between the output terminal of said mixer and the input terminal of said second band pass filter, a low pass filter having input and output terminals, a connection between said source of composite color television signal and said low pass filter input terminal, an adder circuit having input and output terminals, a connection between the output terminal of said low pass filter and an input terminal of said adder circuit, a connection between the output terminal of said second band pass filter and the input terminal of said adder circuit, utilization means having an input terminal, and a connection between the output terminal of said adder circuit and the input terminal of said utilization means.

2. Apparatus according to claim 1 wherein said connection between the output terminal of said low pass filter and an input terminal of said adder circuit includes a delay line.

3. Apparatus according to claim 1 wherein the highest frequency passed by said low pass filter is lower than the lowest frequency passed by said second band pass filter.

JOSEPH G. REDDECK.

References Cited in the file of this patent

"An Analysis of the Sampling Principles of the Dot-Sequential Color Television System," RCA Review, June–September, 1950.